US012227000B2

(12) United States Patent
Dahlmann et al.

(10) Patent No.: US 12,227,000 B2
(45) Date of Patent: Feb. 18, 2025

(54) PRINTER

(71) Applicant: Weidmüller Interface GmbH & Co. KG, Detmold (DE)

(72) Inventors: Markus Dahlmann, Rheda-Wiedenbrüc (DE); Thorsten Bornefeld, Schlangen (DE); Rico Schindler, Porta Westfalica (DE); René Manke, Bielefeld (DE); Thomas Köster, Schlangen (DE)

(73) Assignee: Weidmüller Interface GmbH & Co. KG (DE)

( * ) Notice: Subject to any disclaimer, the term of this patent is extended or adjusted under 35 U.S.C. 154(b) by 181 days.

(21) Appl. No.: 18/006,939

(22) PCT Filed: Jul. 28, 2021

(86) PCT No.: PCT/EP2021/071138

§ 371 (c)(1),
(2) Date: Jan. 26, 2023

(87) PCT Pub. No.: WO2022/023410

PCT Pub. Date: Feb. 3, 2022

(65) Prior Publication Data

US 2023/0294429 A1 Sep. 21, 2023

(30) Foreign Application Priority Data

Jul. 31, 2020 (DE) ..................... 10 2020 120 256.3

(51) Int. Cl.

*B41J 13/12* (2006.01)
*B41J 3/38* (2006.01)

(Continued)

(52) U.S. Cl.

CPC ............... *B41J 13/12* (2013.01); *B41J 3/387* (2013.01); *B41J 3/407* (2013.01); *B41J 13/0063* (2013.01);

(Continued)

(58) Field of Classification Search

CPC .... B65H 31/12; B65H 31/18; B65H 2405/32; B65H 2405/321; B65H 2405/3211; B65H 2405/121; B65H 2801/03

(Continued)

(56) References Cited

U.S. PATENT DOCUMENTS

| | | | |
|---|---|---|---|
| 5,645,396 | A | 7/1997 | Romanowski |
| 5,838,338 | A | 11/1998 | Olson |

(Continued)

FOREIGN PATENT DOCUMENTS

| | | | |
|---|---|---|---|
| CN | 100355577 | C | 12/2007 |
| DE | 19726236 | C2 | 6/1997 |

(Continued)

*Primary Examiner* — Jeremy R Severson

(74) *Attorney, Agent, or Firm* — LAUBSCHER & FRETWELL, P.C.

(57) ABSTRACT

A printer for printing plate-like media, in particular for printing marker cards with markers for marking electrical appliances includes a housing and at least one input station for the marker cards to be printed The printer further includes a printing station with a printing device and an output station for printed marker cards. The output station has a magazining device which has one or more guide devices so that the output station, with the magazining device, can be drawn from a position pushed into the housing into a position outside the housing and can be pushed back into the housing of the printer, Each guide device also has its own stacking unit which is pivotably mounted.

18 Claims, 18 Drawing Sheets

(51) Int. Cl.

| | |
|---|---|
| ***B41J 3/407*** | (2006.01) |
| ***B41J 13/00*** | (2006.01) |
| ***B65H 31/02*** | (2006.01) |
| ***B65H 31/30*** | (2006.01) |

(52) U.S. Cl.

CPC ......... *B65H 31/02* (2013.01); *B65H 31/3063* (2013.01); *B65H 2405/1122* (2013.01); *B65H 2405/12* (2013.01); *B65H 2405/324* (2013.01); *B65H 2701/1914* (2013.01)

(58) Field of Classification Search

USPC .......................................................... 271/212

See application file for complete search history.

(56) References Cited

U.S. PATENT DOCUMENTS

| | | | | |
|---|---|---|---|---|
| 6,428,000 | B1 | 8/2002 | Hara et al. | |
| 6,805,346 | B2 * | 10/2004 | Stemmle ................ | B65H 31/18 271/178 |
| 8,955,833 | B2 | 2/2015 | Suzuki et al. | |
| 2003/0090049 | A1 * | 5/2003 | Hill ........................ | B65H 39/14 270/32 |
| 2003/0155419 | A1 | 8/2003 | Bretl et al. | |
| 2005/0094227 | A1 | 5/2005 | Dwang et al. | |
| 2013/0221598 | A1 | 8/2013 | Washino et al. | |
| 2014/0035218 | A1 | 2/2014 | Koyama et al. | |

FOREIGN PATENT DOCUMENTS

| | | | |
|---|---|---|---|
| DE | 202006005458 | U1 | 9/2007 |
| DE | 102013104780 | A1 | 5/2013 |
| EP | 0885824 | B1 | 4/1998 |
| EP | 2335933 | A2 | 6/2011 |
| JP | H0761635 | A | 3/1995 |

* cited by examiner

PRINTER

This application is a § 371 National stage entry of international patent application No. PCT/EP 2021/071138 filed Jul. 28, 2021 which claims priority of patent application No. DE 102020120256.3 filed Jul. 31, 2020. The entire content of these applications is incorporated herein by reference.

BACKGROUND OF THE INVENTION

The present invention relates to a printer for printing plate-like media, in particular for printing marker cards with markers for marking electrical appliances and a printing process for printing plate-like media, in particular marker cards.

BRIEF DESCRIPTION OF THE PRIOR ART

A printer and a plate-like printed medium, in particular a card or marker for marking electrical appliances, connectors, cables or the like, are known from DE 20 2006 005 458 U1, wherein at least one or a plurality of markers is/are combined to form a card. The printed medium, in particular the markers, are provided with imprints in the course of a pass through a printer. In this case, the printed medium, in particular the card, is provided with a first device for torsion resistance, which is configured for interacting with a corresponding device for torsion resistance on the printer in such a way that printing of the printed medium—in particular the card—is possible only when the printed medium is inserted in a correct orientation. Furthermore, this device can also be used as a further surface for printing, e.g. in order to title the project for which the markers of the pad are intended.

Furthermore, a magazining device and a method for stacking printed marker cards in a column magazine is known from is DE 10 2013 104 780 A1. According to the technical teaching of DE 10 2013 104 780, it is known to arrange the magazining device on the output side of a printer outside the printer housing.

Additional prior art is found in DE 197 26 236 C2 and in EP 0 885 824 B1, for example.

The printing devices according to the prior art have proven to be good in practice, but an installation-space-saving arrangement in particular of the magazining device for stacking printed marker cards is desirable.

The object of the present invention is to solve this problem.

SUMMARY OF THE INVENTION

Accordingly, it is a primary objection of the invention to provide a printer for printing plate-like media, in particular for printing marker cards with markers for marking electrical appliances wherein the printer has a housing and at least one input station for the marker cards to be printed, a printing station with a printing device and an output station of printed marker cards. The output station has a magazining device which has one or more guide devices so that the output station, with the magazining device, can be drawn from a position within the housing into a position outside the housing and can be pushed back into the housing of the printer. Each of the respective guide devices also has its own stacking unit which is pivotably mounted.

In this way, the output station can be pulled out of a pushed-in position together with the magazining device for use and then can be pushed into the housing of the printer from a pulled-out position outside the housing after use, when the printer is not being used. As a result, an installation-space-saving arrangement of the output station of the printer and thus also of the printer overall is created.

It is additionally envisaged that the stacking unit of the magazining device is pivotably mounted. As a result, a simple pivoting mechanism is provided in order to pivot the stacking unit in the pulled-out position such that it can be accommodated simply in a free installation space of the printer when the output station is pushed into the housing of the printer. In the pulled-out position, the stacking unit can be pivoted back appropriately. Without the pivoting mechanism, there could be the problem that the stacking unit would not be able to be pushed into the printer since it is in a position in which there would be no free installation space in the housing. This problem is solved in a simple manner by the stacking unit's ability to pivot.

The respective stacking unit has an axis of rotation which is arranged parallel to the push-in direction or parallel to the respective guide aperture of the guiding device. This is advantageous in order to be able to pivot the stacking mechanism into the pulled-out position and to pivot it back in again after use.

According to the invention, the output station, in operation, can be pulled out of the housing (while being able to remain connected to the printer via a guiding device with an end stop or the like), so that it is still retained on the printer. In the pulled-out position, the pivoting mechanism is used in order to pivot the respective stacking unit into an operating position. The printed marker cards can then be stacked in the output station. In the non-used position, the pivoting mechanism is pivoted back and then the stacking mechanism or drawer is pushed into the housing.

According to one embodiment, the magazining device can function like an underfeed magazining according to a FiFo (First-in, First-out) principle. As a result, the printer can automatically print a plurality of marker cards and output them in the inputted order.

The magazining device, according to a preferred embodiment, has two guide devices arranged parallel and/or formed symmetrically to one another. This is structurally simple and contributes to an installation-space-saving design.

It is also advantageous if the respective guide device, according to a further embodiment, has an elongated-hole-like guide aperture via which the respective guide device is displaceably guided in the housing of the printer. As a result, a structurally simple guide device is created which can be manufactured inexpensively.

In a further embodiment, the respective guide device can be attached at its free end to a cover. As a result, there is created a drawer which, in the pulled-out state of the printer's housing, forms a column magazine for receiving the magazined stack with printed marker cards, and can also receive the magazining device.

In a further embodiment, the length of the guide aperture defines the length of the extraction path of the magazining device from the housing of the printer and the length of the shaft magazine which forms through the extraction of the magazining device. As a result, there arises a simple operation, less prone to operator error, of the magazining device and of the output station of the printer.

The guide device according to a further embodiment has a shaft supported in each case in two bearing brackets. A cantilever arm/actuation lever attached to the shaft in the interior of the printer receives a vertical force from a drive and thus can cause the shaft to rotate.

According to a further embodiment, a pivoting frame is connected in a rotationally fixed manner to the respective shaft. As a result, there arise reliable stroke kinematics, designed in a structurally simple manner, for the magazining device.

It is also advantageous if the respective pivoting frame has several openings and, between the openings, in each case cross webs and two longitudinal webs. In particular, each stacking tray respectively has openings, which are each engaged through by the cross webs of the respective pivoting frame. As a result, an installation-space-saving arrangement of the stroke kinematics and of the stacking tray on which the printed marker cards are deposited in the FiFo principle is provided.

The method according to the invention includes the following steps:

a) providing the printer and at least one marker card, which is to be printed, with markers,
b) pulling the output station out of the housing of the printer and pivoting out the stacking unit of the respective guide device of the output station;
c) inserting at least one marker card to be printed into the column magazine of the input station of the printer;
d) separating the at least one marker card to be printed in the separating device of the input station of the printer;
e) conveying the at least one separated marker card into the printing station of the printer;
f) printing the at least one marker card through the printing device of the printer;
g) conveying the at least one printed marker card into the output station of the printer;
h) outputting the at least one printed marker card into the magazining device of the output station of the printer;
i) magazining the at least one printed marker card by the magazining device of the output station of the printer into the column magazine in accordance with the FiFo principle; and
j) removing the at least one printed marker card from the column magazine of the output station of the printer.

Furthermore, the following method step is preferably carried out after method step j):

k) pivoting the stacking unit of the respective guide device of the output station inwards and pushing the output station into the housing of the printer.

BRIEF DESCRIPTION OF THE FIGURES

The invention will be described in greater detail below with reference to the accompanying drawing. The invention is not limited to these exemplary embodiments, but rather can also be implemented in another manner. In the drawing.

DETAILED DESCRIPTION

Figure 1:
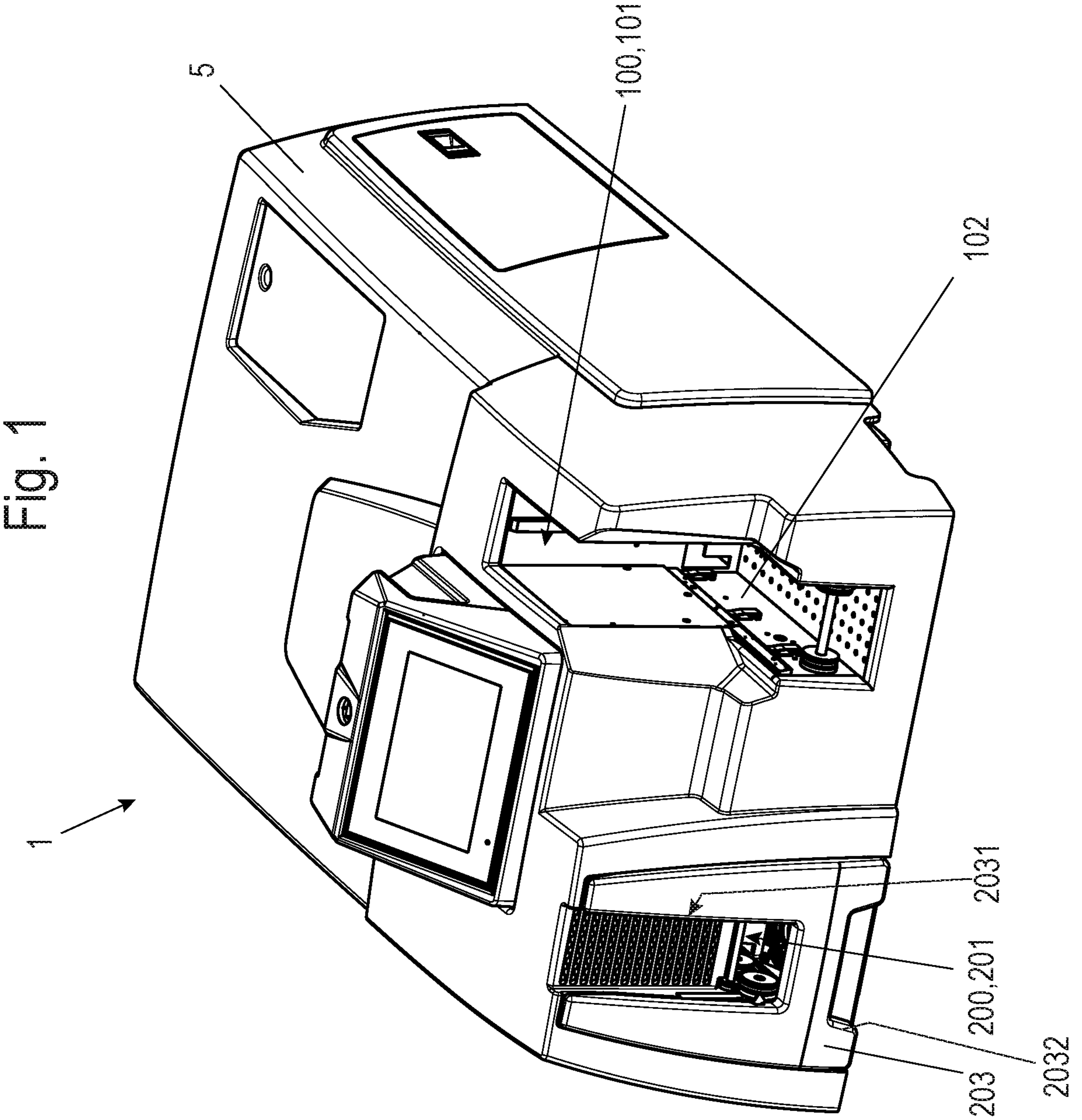
FIG. 1 is a perspective view of a printer according to the invention with a column magazine for inputting plate-like media to be printed, and a column magazine for outputting the printed plate-like media in a rest position.

FIG. 1 depicts a printer 1 according to the invention for printing plate-like media, in particular for printing marker cards 2 with markers 3 for marking electrical appliances. These plate-like media, such as marker cards 2 with at least one marker 3, are usually made of plastic.

The printer 1 has an input station 100. The input station 100 has a column magazine 101, in which the marker cards 2 to be printed are inserted on top of one another in a stack. In order to be able to print a marker card 2, it is necessary to separate a card from the stack. A separation device 102 is provided for this purpose, for which one marker card 2 is separated in each case from the stack and is then printed. The column magazine 101 and the separation device 102 function in accordance with a “First-in, First-out” (“FiFo”) principle. This is realized through the arrangement of the separation device 102 under or on the bottom of the column magazine 101. The separation device 102 works with the “gate valve/retaining valve” principle or a different functioning principle which supports the “FiFo” principle.

The respective marker card 2 to be printed can, for example, be conveyed into the printer 1 by a round-belt conveyor. For this purpose, the respective marking card has two u-shaped guide rails 4a. 4b with which the respective marker card 2 sits on the round belt and is thus carried along, or conveyed, by the respective round belt.

The printer 1 furthermore includes a printing station (not shown). The printing station has a printing device (also not shown). The printing device preferably functions in accordance with an inkjet printing method. Alternatively, the printing device can also function according to a different printing method, such as a laser printing method or a thermoprinting method.

Furthermore, the printer 1 has an output station 200, in which the printed marker cards 2 with markers 3 are output. The printer 1 can have further stations, e.g. a fixing station, which is arranged after the printing station and which precedes the output station 200.

The output station 200 of the printer 1 is preferably formed like a drawer. As a result, in a space-saving manner, the output station 200 can be pulled out of a housing 5 of the printer 1 when printing is being performed and pushed into the housing 5 of the printer 1 again when the printer 1 is not being used. The respective printed marker card 2 can be conveyed into the output station e.g. by a round-belt conveyor.

FIG. 1 shows the output station 200 in a closed state and is accordingly substantially pushed into the housing 5 of the printer 1. A cover 203 is visible. This cover can have a first indentation or recess 2031 and a further indentation or recess 2032.

When the output station 200 is the opened state (see FIG. 2) the first indentation 2031 provides an additional hand-gripping possibility under the stack of the marker cards 2 in the column magazine 201. As a result, a process of removing the marker cards 2 from the column magazine 201 is simplified. Furthermore, the indentation 2031 facilitates a lateral guiding of the growing stack of the marker cards 2 in the column magazine 200 (see FIG. 15).

Figure 2:
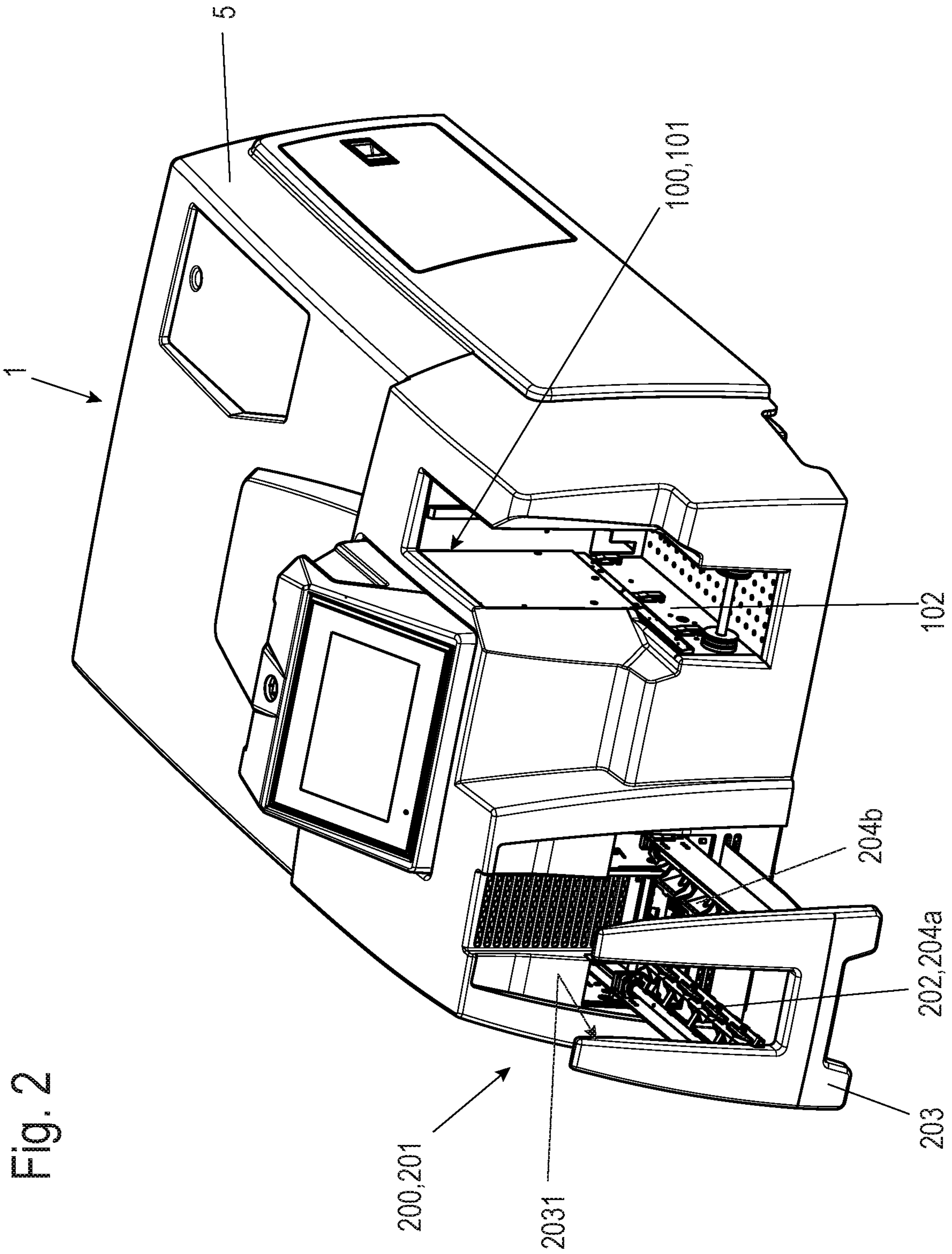
FIG. 2 is a perspective view of the printer from FIG. 1 with the column magazine for outputting the printed plate-like media in a working position.

Furthermore, when the output station 200 is in the opened state (see FIG. 2), the first indentation 2031 provides visibility into a column magazine 201 of the output station 200 from the front, as long as the output station 200 is opened, i.e. is pulled out from the housing 5 of the printer 1. As a result, an operator of the printer 1 can simply observe the filling state of the column magazine 201, without having to closely approach the printer in order to then look onto the column magazine 201 from above. The second indentation 2032 is intended as a handle of the drawer-like output station 200, with which the output station 200 can be brought out of its closed state into an opened state, as shown in FIG. 2.

By opening the output station 200 into a pulled-out position on the printer outside the housing, an installation space is freed up for the column magazine 201. The column magazine 201 serves to output the printed marker cards 2 on top of one another in a stack.

In order to be able to magazine the marker cards 2, a magazining device 202 can be provided, with which in each case a printed marker card 2 is pushed into the stack.

The column magazine 201 and the magazining device 202 function in accordance with a "First-in, First-out" ("FiFo") principle. This is realized by an "underfeed magazining" by the magazining device 202 on the bottom of the column magazine 201 and will be explained below in greater detail. The magazined stack of printed marker cards 2 can be manually removed from the column magazine 201 after the magazining process or even during the magazining process.

Figure 3:
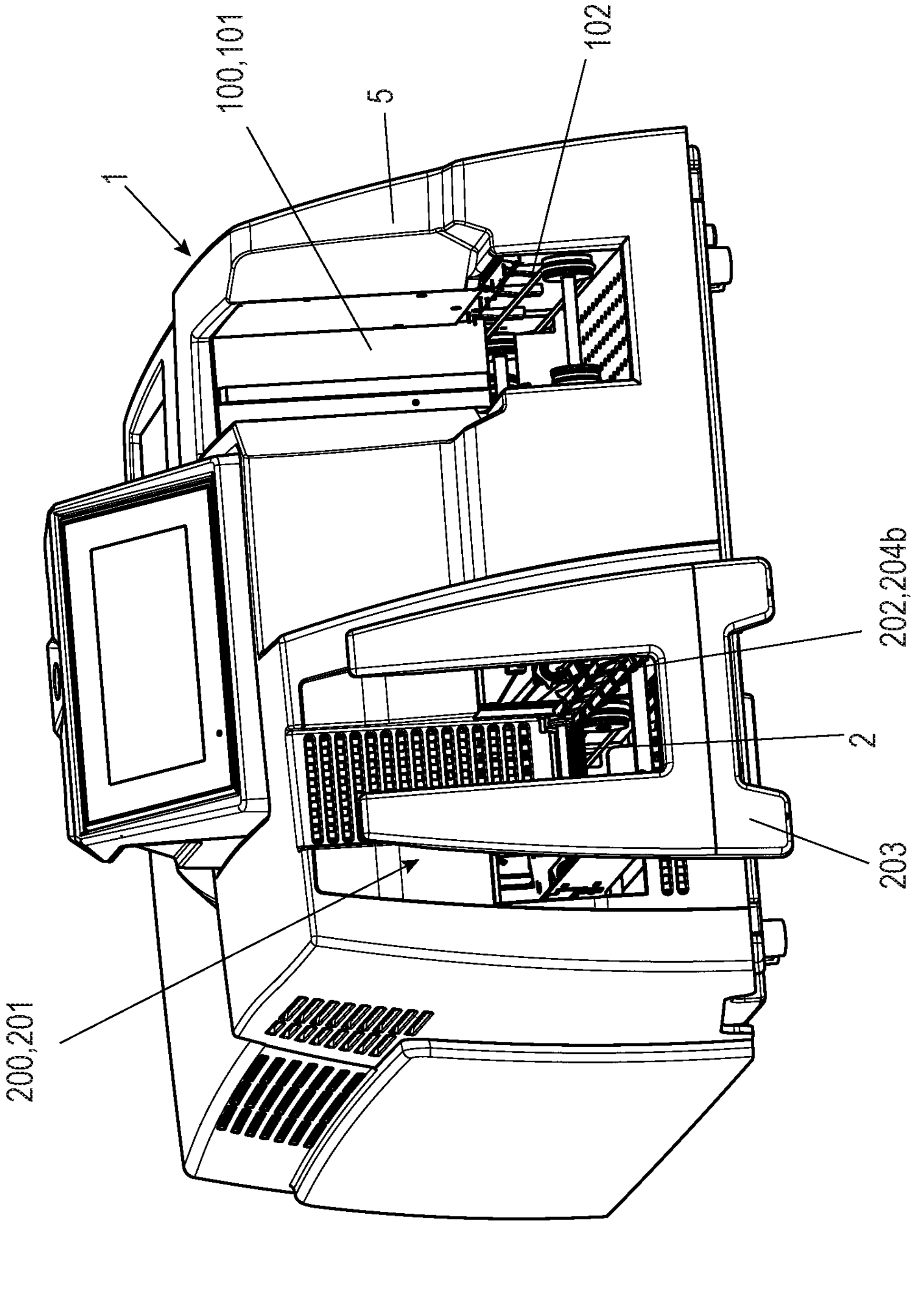
FIG. 3 is a perspective view of the printer from FIG. 2 with the two column magazines and a separation device in the column magazine for inputting plate-like media to be printed and a magazining device in the column magazine for outputting the printed plate-like media.

FIG. 3 shows the output station 200 in the opened state with the magazining device 202 and the column magazine 201 and the input station with the column magazine 101 and the separation station 102 (this can also be referred to as a "pulled-out position").

Figure 4:
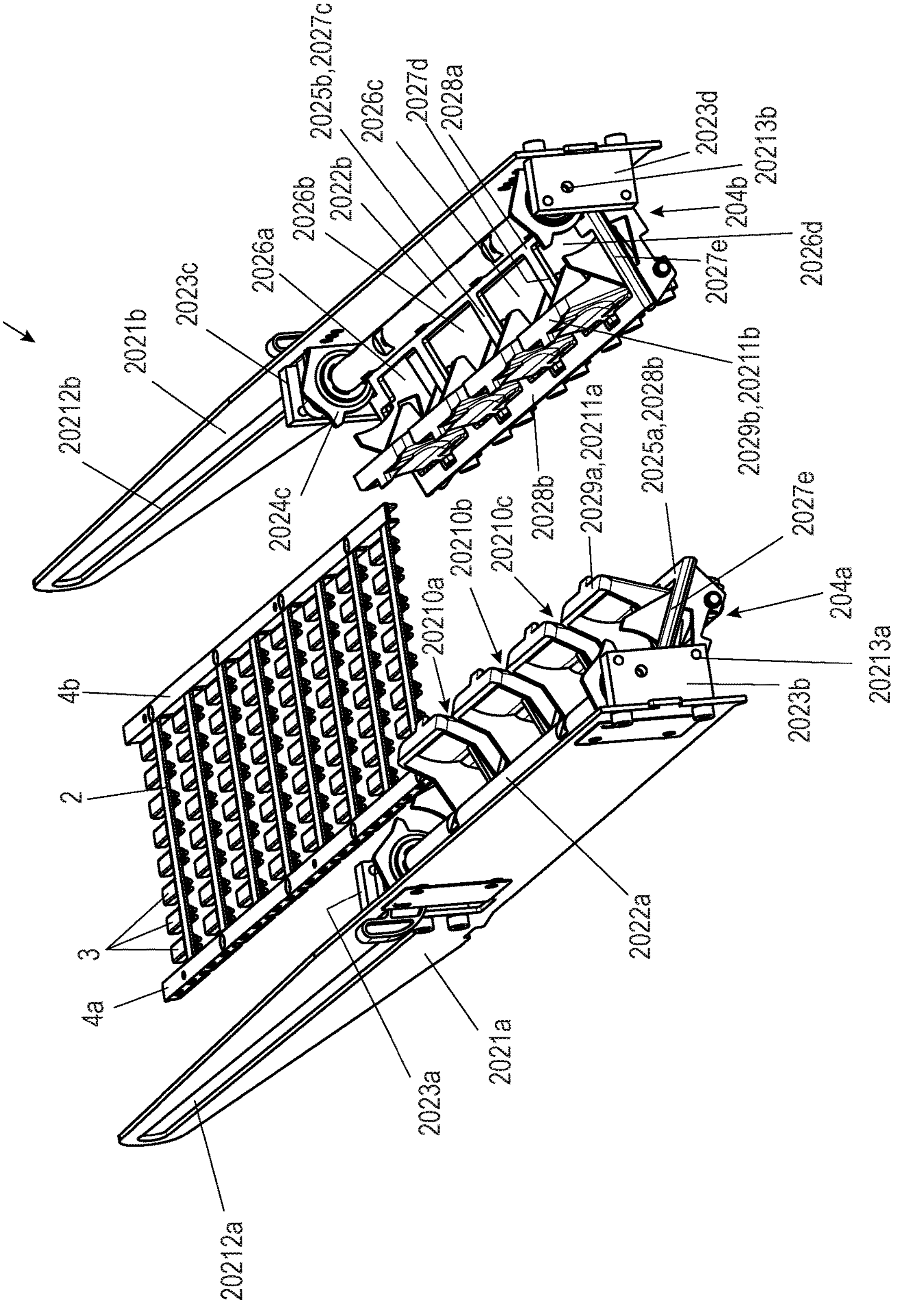
FIG. 4 is an exploded perspective view of the magazining device in a home position with a printed plate-like medium to be magazined.

FIG. 4 shows the magazining device 202 without adjacent components and in a home position. The magazining device 202 can two guide devices 2021a. 2021b which are arranged parallel and preferably symmetrical to one another.

The respective guide device 2021a, 2021b can furthermore have an elongated-hole-like guide aperture 20212a, 20212b via which the respective guide device 2021a, 2021b is displaceably guided in the housing 5 of the printer 1. In this way, it cannot fall out of the housing 5 in the pulled-out position, if, at the housing, devices such as pins engage in these guide apertures 20212a. 20212b.

Alternatively, the respective guide device 2021a. 2021b can be firmly attached to a movable guide slide at the printer. The respective guide device 2021a. 2021b can then be attached to the cover 203 at its free end (not show).

The length of the guide aperture 20212a, 20212b firmly specifies the length of the extraction path of the magazining device 202 from the housing 5 of the printer 1 and thus also the length of the shaft magazine 201 which forms through the extraction of the magazining device 202 and preferably corresponds substantially to the length of the marker card 2.

The respective guide device 2021a, 2021b can in each case have a shaft 2022a, 2022b which in each case is supported in two bearing brackets 2023a, b, c, d. There can be attached to the shafts 2022a, 2022b a cantilever arm and/or actuation lever (not shown), which, in the interior of the printer, receives a vertical force from a drive and thus can cause the respective shaft 2022a, 2022b to rotate. Pivot angle restrictors 2024a. 2024b. 2024c. 2024d are provided which are rotatably mounted and which bear the shafts 2022a, 2022b. One pivoting frame 2025a, 2025b in each case is connected in a rotationally fixed manner to the respective shaft 2022a, 2022b.

The respective pivoting frame 2025a, 2025b can have several openings—four openings 2026a, 2026b, 2026c. 2026d in the embodiment shown—and has, between the openings 2026a, 2026b, 2026c. 2026d, in each case cross webs 2027a, 2027b, 2027c. 2027d, 2027e and two longitudinal webs 2028a. 2028b here. The respective shaft-side longitudinal web 2028b can be connected in a rotationally fixed manner to the respective shaft 2022a, 2022b, so that the respective pivoting frame 2025a, 2025b can perform a pivoting or rotating movement of the respective shaft 2022a, 2022b synchronously with the respective shaft 2022a. 2022b.

The respective guide device 2021a. 2021b has a stacking tray 2029a. 2029b. The respective stacking tray 2029a, 2029b has openings 20210a, 20210b, 20210c. 20210d, which are each engaged by the cross webs 2027b, 2027c, 2027d of the respective pivoting frame 2025a, 2025b. Each respective stacking tray is formed such that that the two stacking trays 2029a, 2029b are spaced apart from one another in the horizontal direction such that the marker cards 2 to be magazined can be securely deposited on the stacking trays 2029a, 2029b.

The pivoting frame 2025a and the stacking tray 2029a form a first stacking unit 204a and the pivoting frame 2025b and the stacking tray 2029b form a second stacking unit 204b The stacking units 204a. 204b are arranged symmetrically to one another. The respective stacking unit 204a, 204b is pivotably mounted. For this purpose, it has an axis of rotation 20213a and 20213b respectively which is arranged parallel to the push-in direction or parallel to the respective guide aperture 20212a, 20212b of the guiding device 2021a.

2021*b*. It can also coincide with the axis of rotation of the respective shaft 2022*a*. 2022*b* The pivoting angle of the respective stacking tray 2029*a*, 2029*b* can be restricted by a stop.

Figure 5:
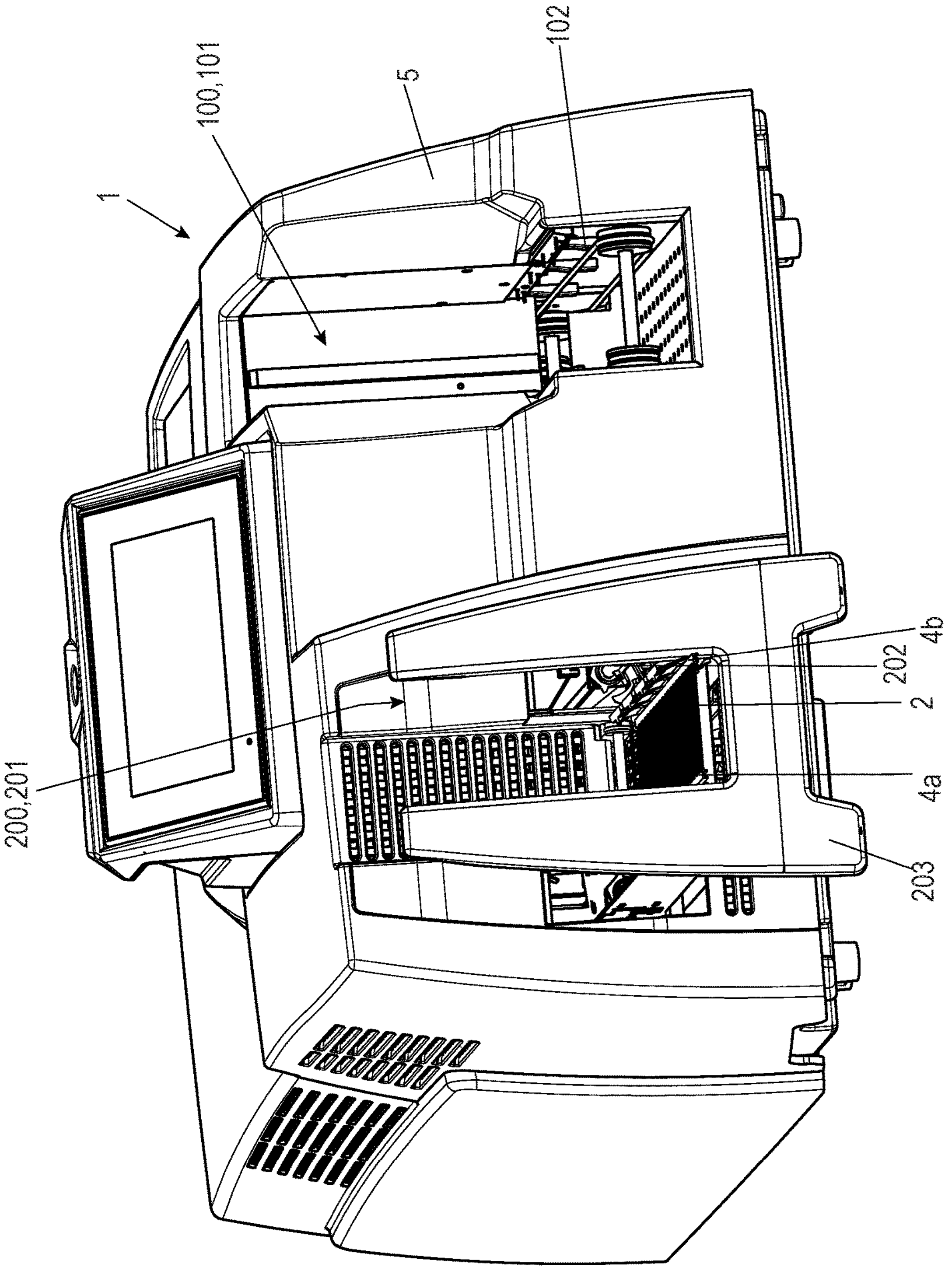
FIG. 5 is a perspective view of the printer from FIG. 3 with a printed plate-like medium retracted into the magazining device.

FIG. 5 shows the printer 1 with the output station 200 in the opened state. In the column magazine 201 opened as a result, a printed marker card 2 is deposited on the respective pivoting frame 2025*a*, 2025*b* of the magazining device 202.

Figure 6:
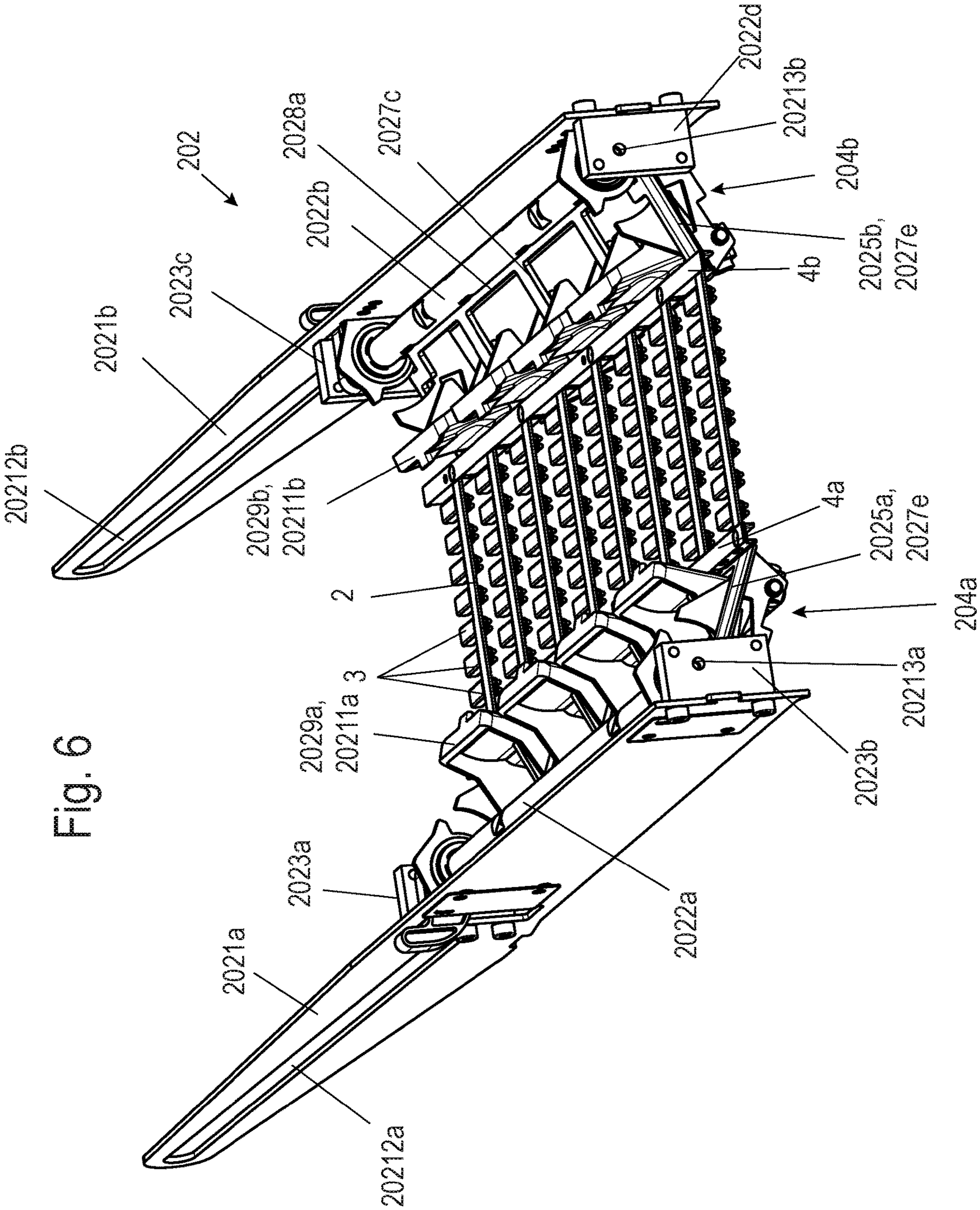
FIG. 6 is a perspective view of the magazining device with a printed plate-like medium retracted into the magazining device.

FIG. 6 shows the marker card 2, as lifted up by the respective pivoting frame 2025*a*. 2025*b*, more precisely by the respective longitudinal web 2028*a* remote from the shaft. For this purpose, the respective shaft 2022*a*. 2022*b* is caused to pivot so that the respective longitudinal web 2028*a* of the respective pivoting frame 2025*a*. 2025*b* grips under the respective u-shaped guide rail 4*a*, 4*b* of the printed marker card 2 and the printed marker card 2 is moved vertically upwards through the synchronous pivoting movement of the respective shaft 2022*a*, 2022*b* and of the respective pivoting frame 2025*a*. 2025*b*. For this purpose, the two shafts 2022*a*, 2022*b* move, or rotate, in opposite directions.

Figure 7:
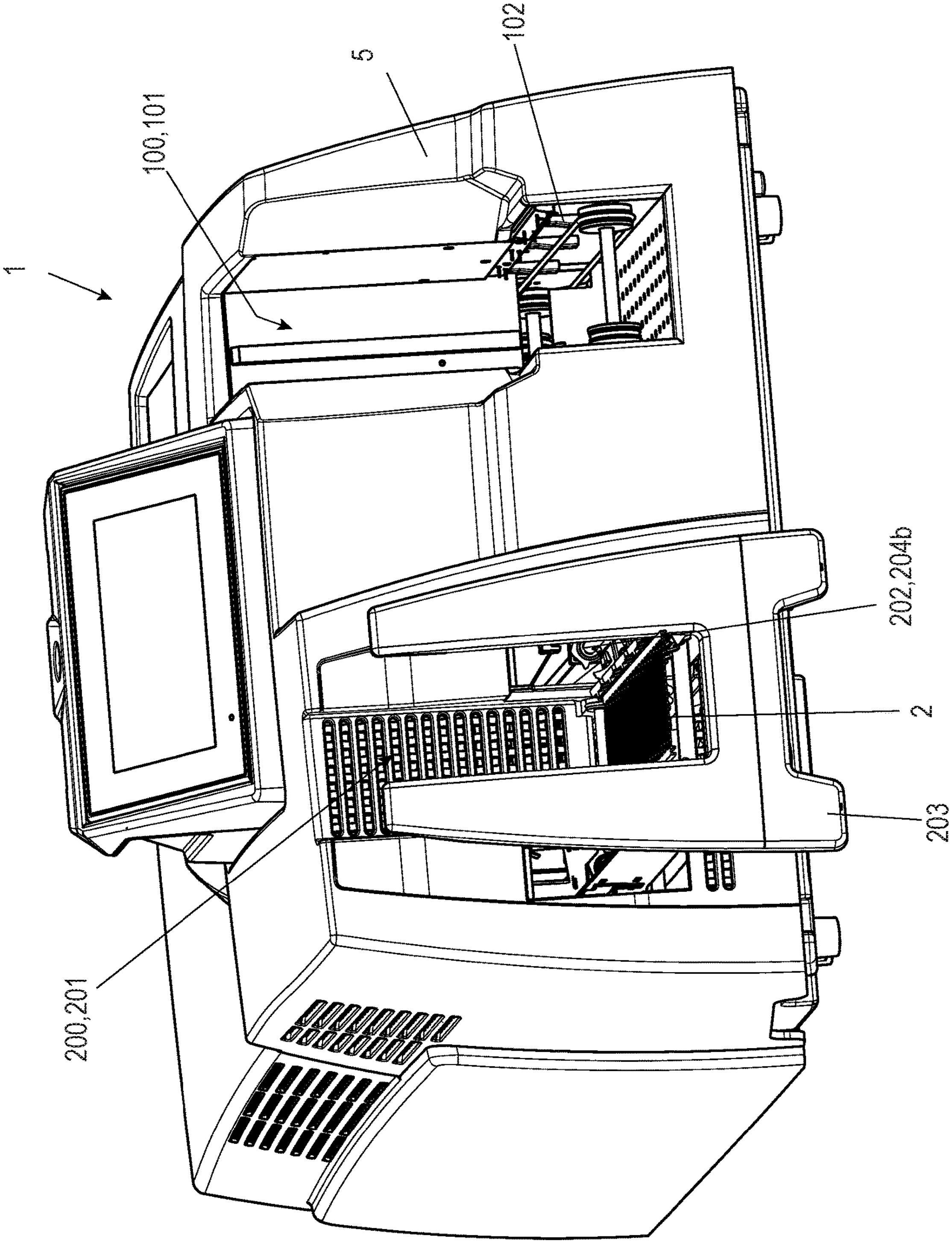
FIG. 7 is a perspective view of the printer from FIG. 5 with a printed plate-like medium lifted up by the magazining device.

FIG. 7 shows the printer 1 with the output station 200 in the opened state. In the column magazine 201 opened as a result, the printed marker card 2 is lifted up by the respective pivoting frame 2025*a*, 2025*b* of the magazining device 202.

Figure 8:
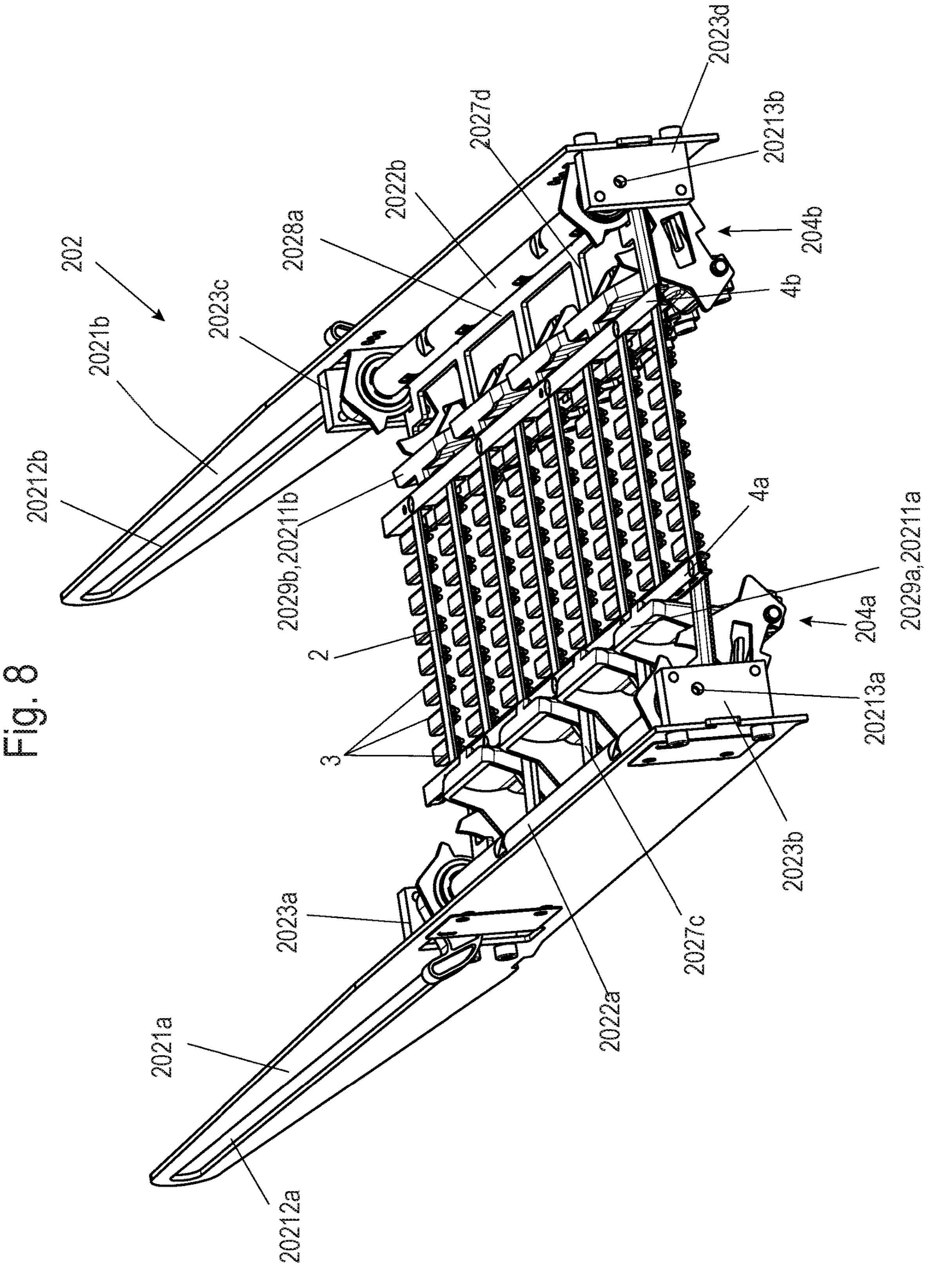
FIG. 8 is a perspective view of the magazining device with a printed plate-like medium lifted up by the magazining device.

FIG. 8 shows the printed marker card 2, as lifted up further by the respective pivoting frame 2025*a*, 2025*b*, more precisely by each longitudinal web 2028*a* remote from the shaft.

Figure 9:
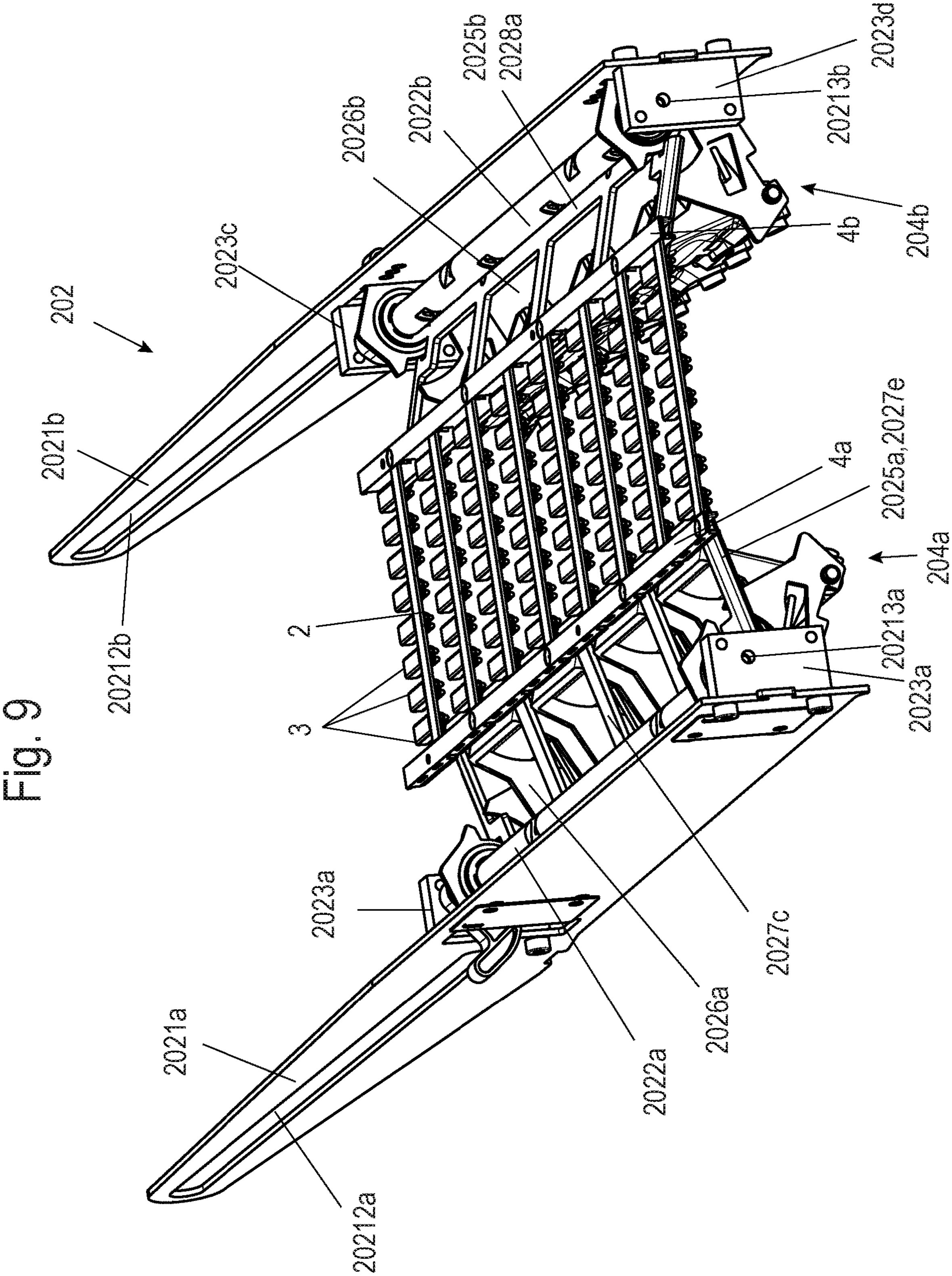
FIG. 9 is a perspective view of the magazining device with a printed plate-like medium further lifted up by the magazining device.

FIG. 9 shows the printed marker card 2, as lifted up further by the respective pivoting frame 2025*a*, 2025*b*, more precisely by the respective longitudinal web 2028*a* remote from the shaft.

Figure 10:
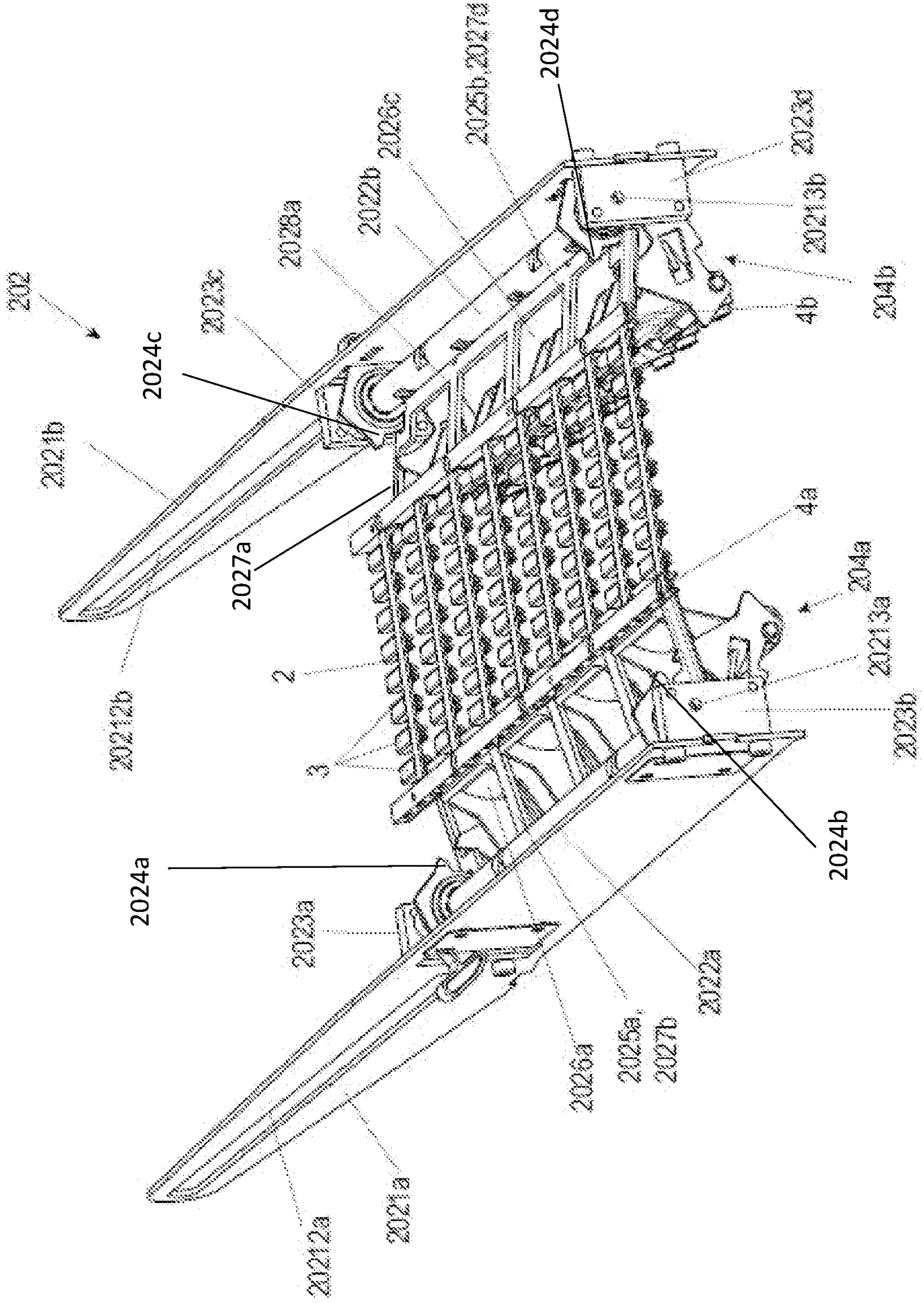
FIG. 10 is a perspective view of the magazining device with a printed plate-like medium further lifted up by the magazining device.

FIG. 10 shows the printed marker card 2, as lifted up further by the respective pivoting frame 2025*a*, 2025*b*, more precisely by the respective longitudinal web 2028*a* remote from the shaft. In this position of the marker card 2, the u-shaped guide rails 4*a*. 4*b* of the marker card 2 touch a respective stacking surface 20211*a*. 20211*b* of the respective stacking tray 2029*a*. 2029*b*.

Figure 11:
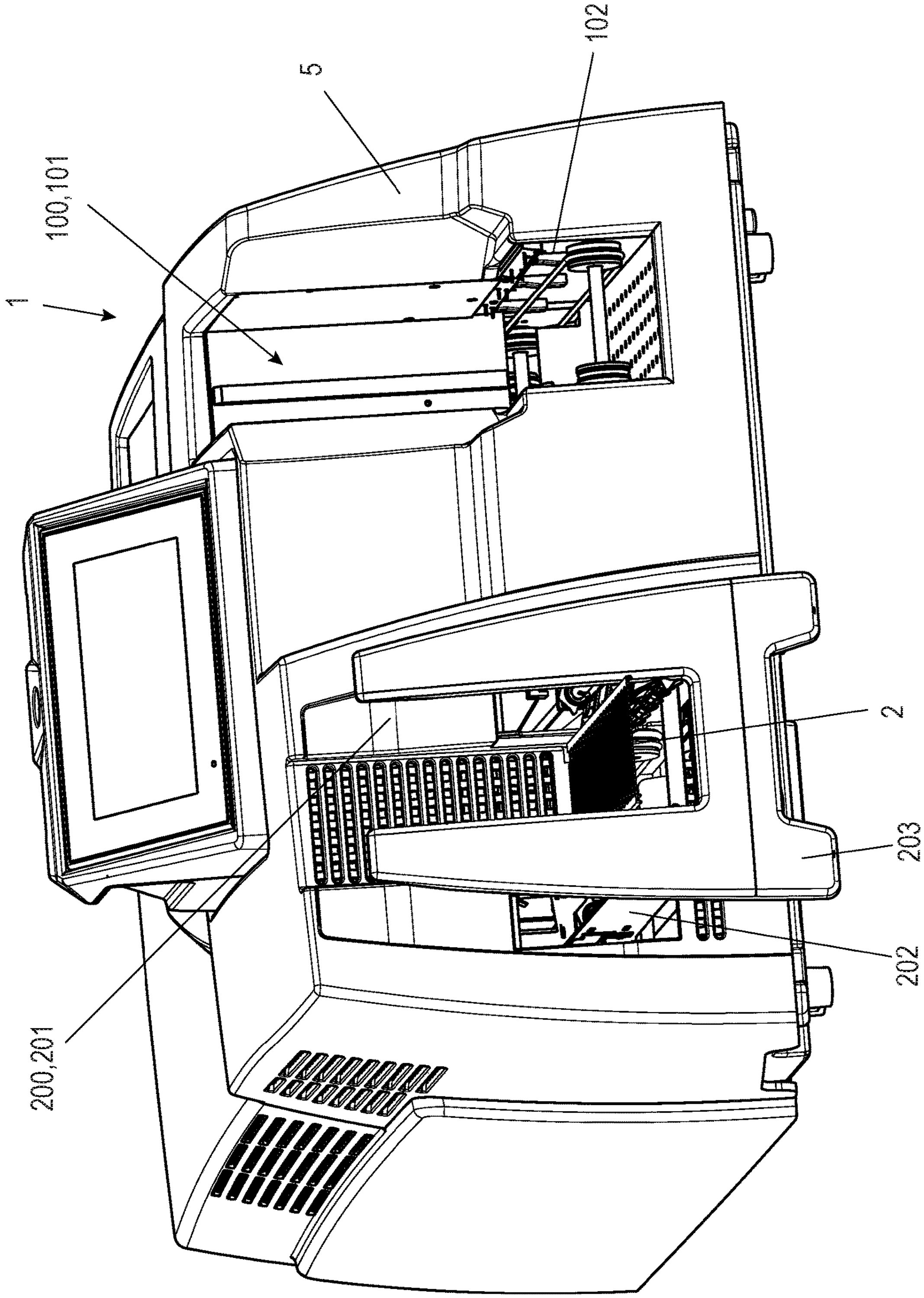
FIG. 11 is a perspective view of the printer from FIG. 7 with a printed plate-like medium further lifted up by the magazining device.

FIG. 11 shows the printer 1 with the output station 200 in the opened state. In the column magazine 201 opened as a result, the printed marker card 2 is further lifted up by the respective pivoting frame 2025*a*, 2025*b* of the magazining device 202.

Figure 12:
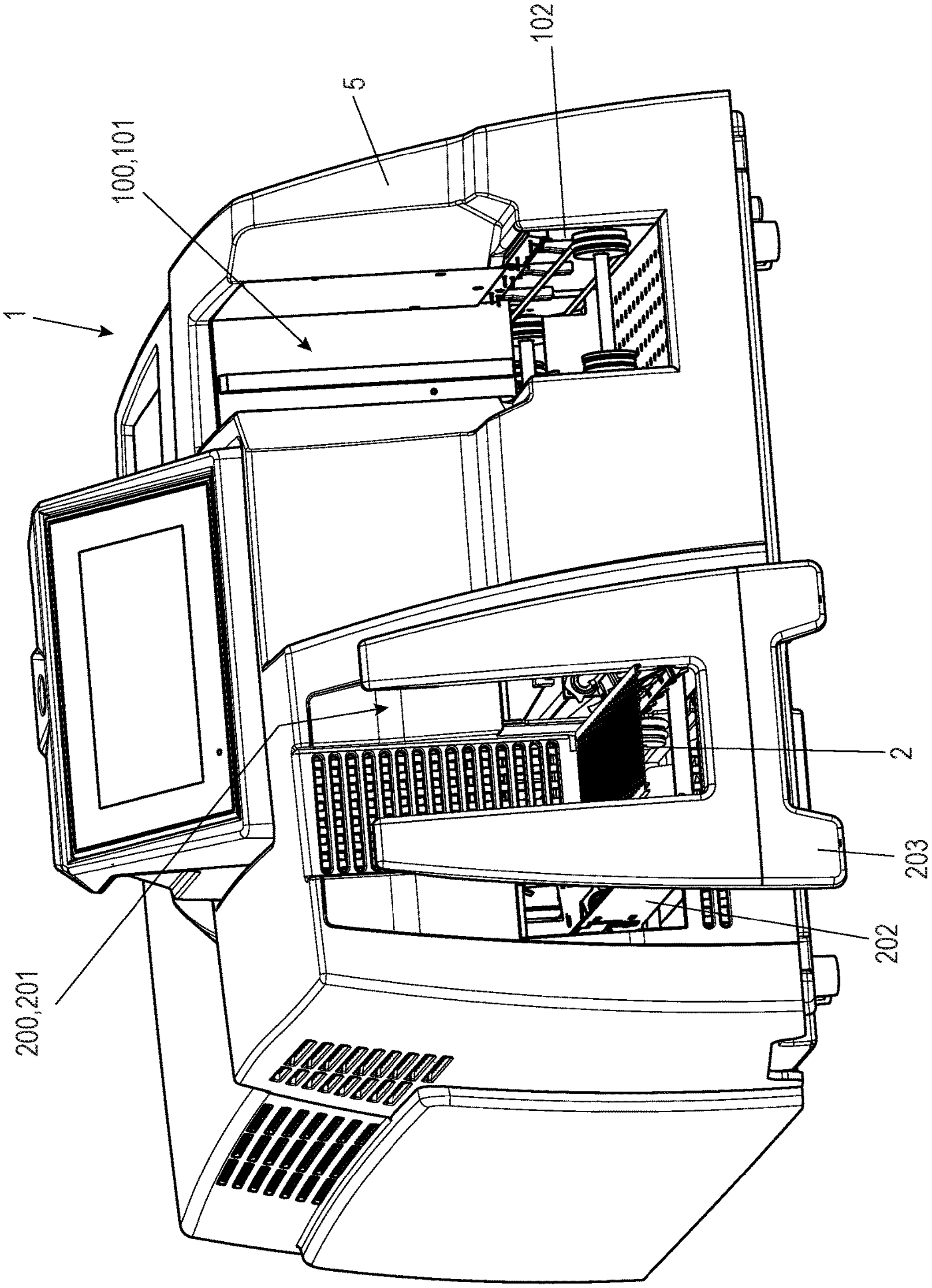
FIG. 12 is a perspective view of the printer from FIG. 11 with a printed plate-like medium further lifted up by the magazining device.

FIG. 12 shows the printer 1 with the output station 200 in the opened state. In the column magazine 201 opened as a result, the printed marker card 2 is deposited by each pivoting frame 2025*a*, 2025*b* of the magazining device 202 onto the respective stacking surface 20211*a*. 20211*b* of the respective stacking tray 2029*a*, 2029*b*.

Figure 13:
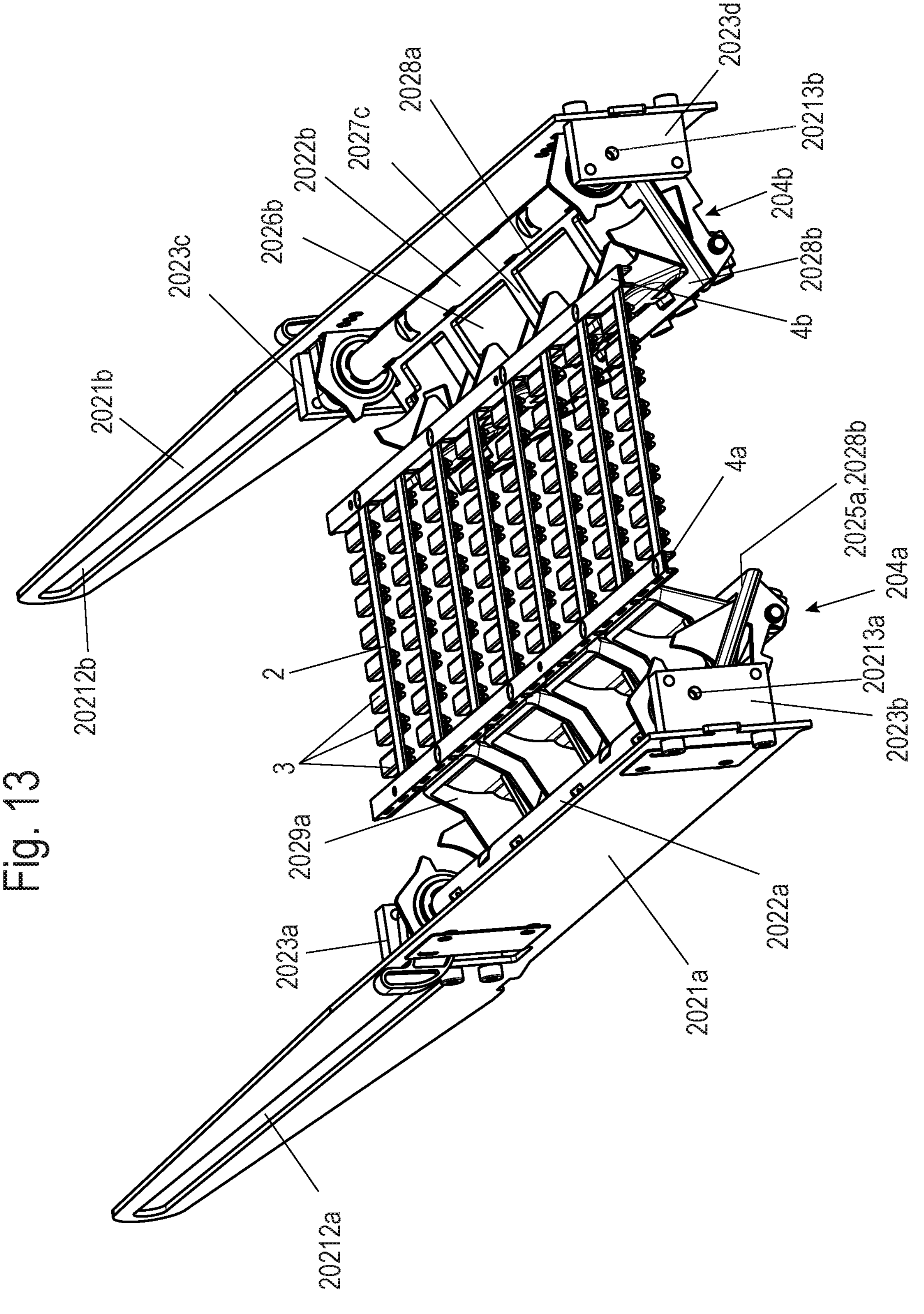
FIG. 13 is a perspective view of view of the magazining device in which the printed plate-like medium is deposited on a tray.

If further printed marker cards 2 are now deposited by the respective pivoting frame 2025*a*. 2025*b* of the magazining device 202 onto the respective stacking surface 20211*a*. 20211*b* of the respective stacking tray 2029*a*, 2029*b*, the previously deposited marker cards 2, or stack of marker cards 2, is lifted up together entirely so that the "new" marker card 2 just being deposited on the respective stacking surface 20211*a*, 20211*b* is magazined under the existing stack of marker cards. The magazining device 202 functions like an underfeed magazining according to the FiFo principle. This is also depicted in FIG. 13.

Figure 14:
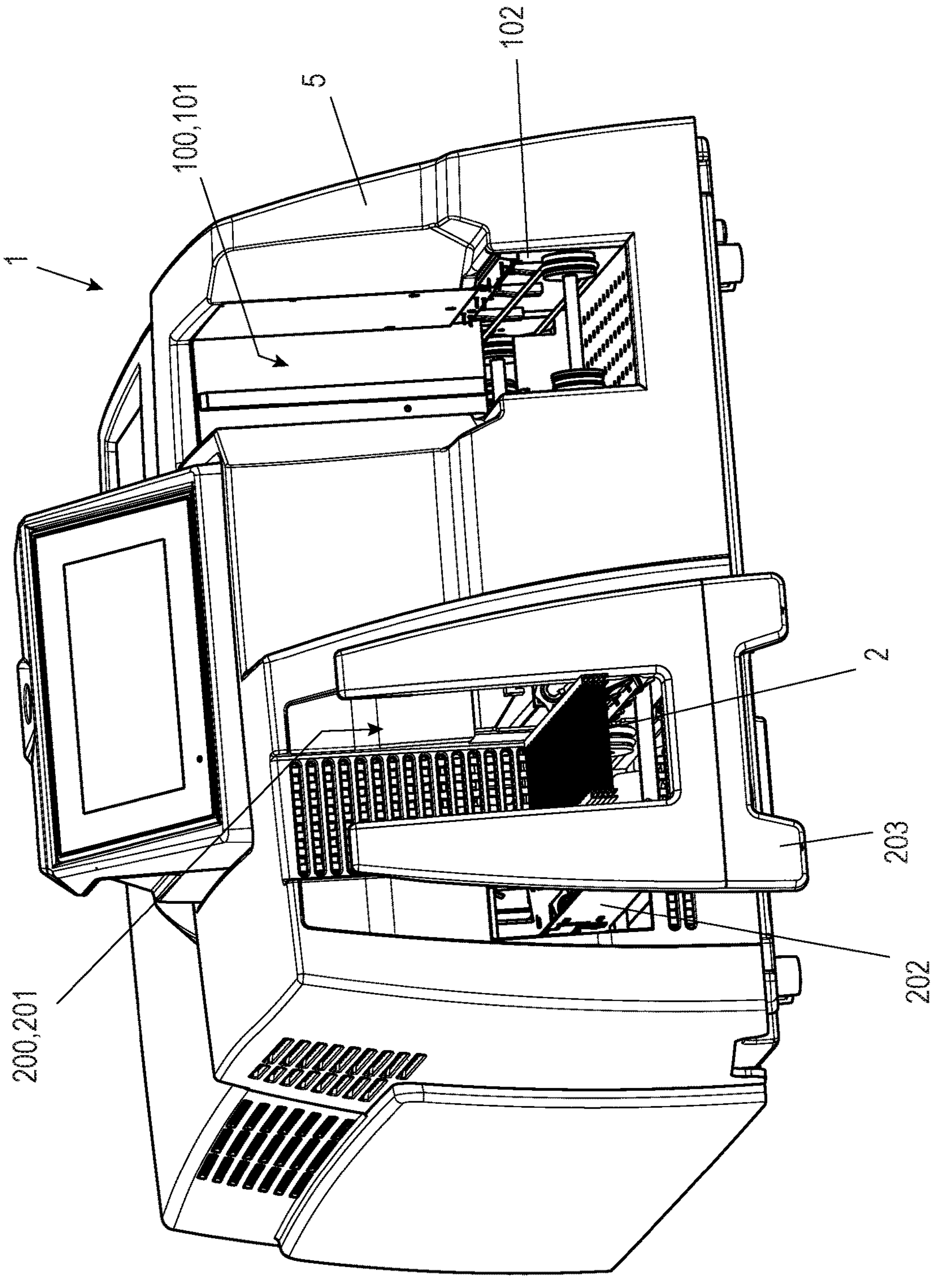
FIG. 14 is a perspective view of the printer from FIG. 12 with several printed plate-like media magazined by the magazining device in the column magazine.
Figure 15:
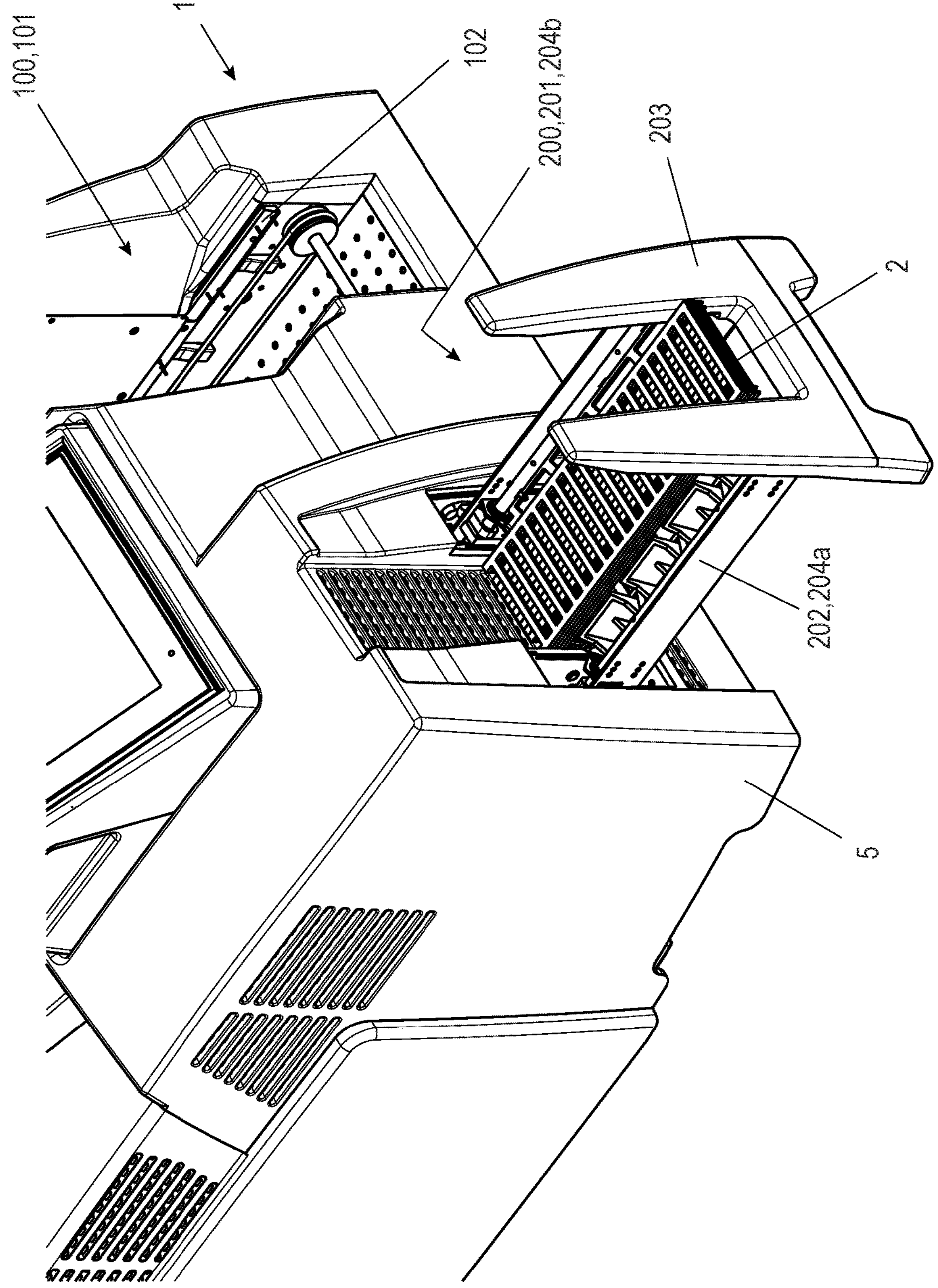
FIG. 15 is a partial detailed perspective view of the printer from FIG. 14.

FIG. 14 shows the printer 1 with the output station 200 again in the opened state. In the thus opened column magazine 201, several printed marker cards 2 are magazined by the magazining device 202 in accordance with the FiFo principle. This is also depicted in FIG. 15.

Figure 16:
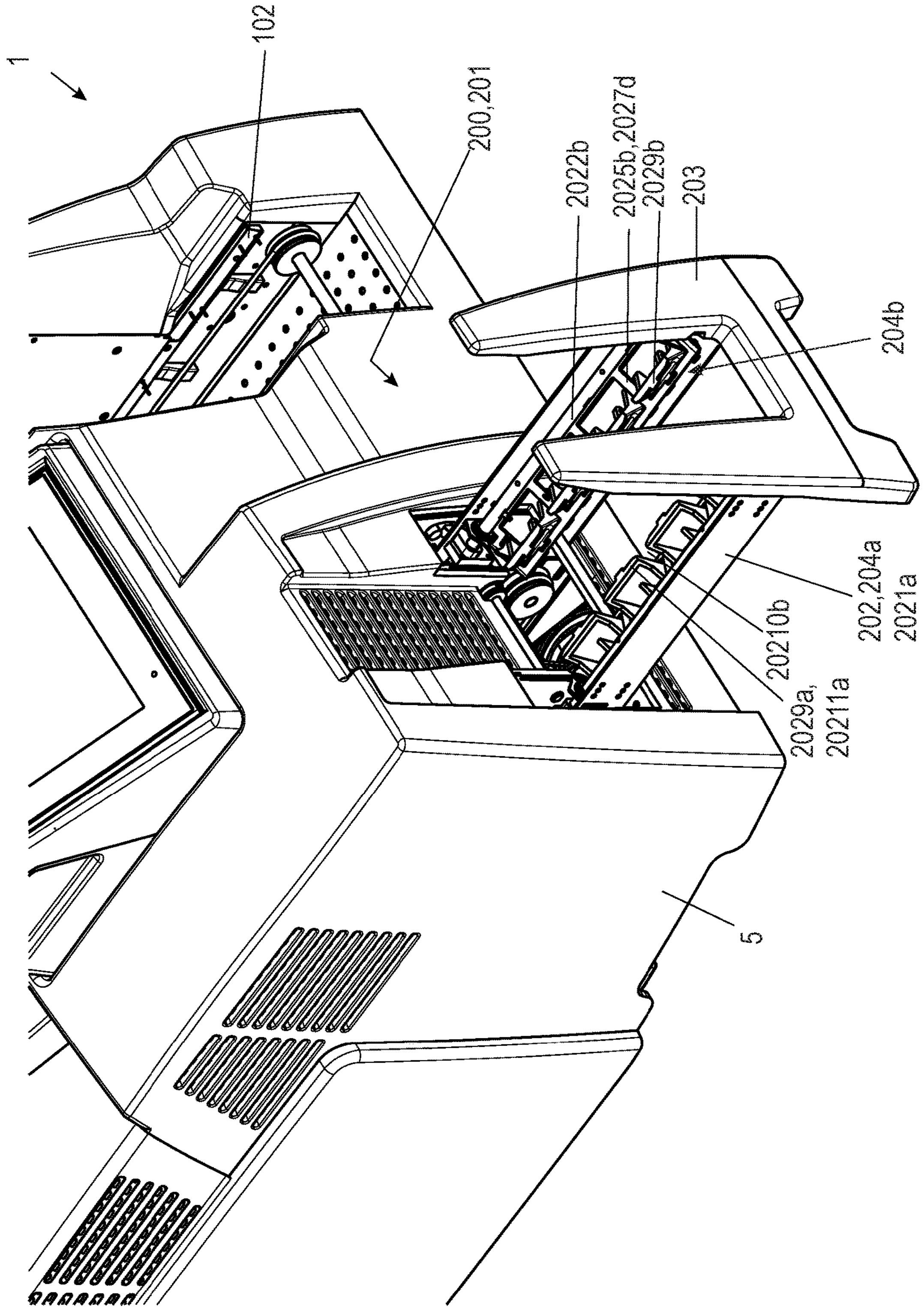
FIG. 16 is a perspective view of the printer from FIG. 15 with an empty column magazine for outputting the printed plate-like media in the working position.

FIG. 16 also shows the printer 1 with the output station 200 in the opened state. In the opened column magazine 201, the printed marker cards 2 are removed so that the column magazine 201 is empty and the magazining device 202 is in its home position.

Figure 17:
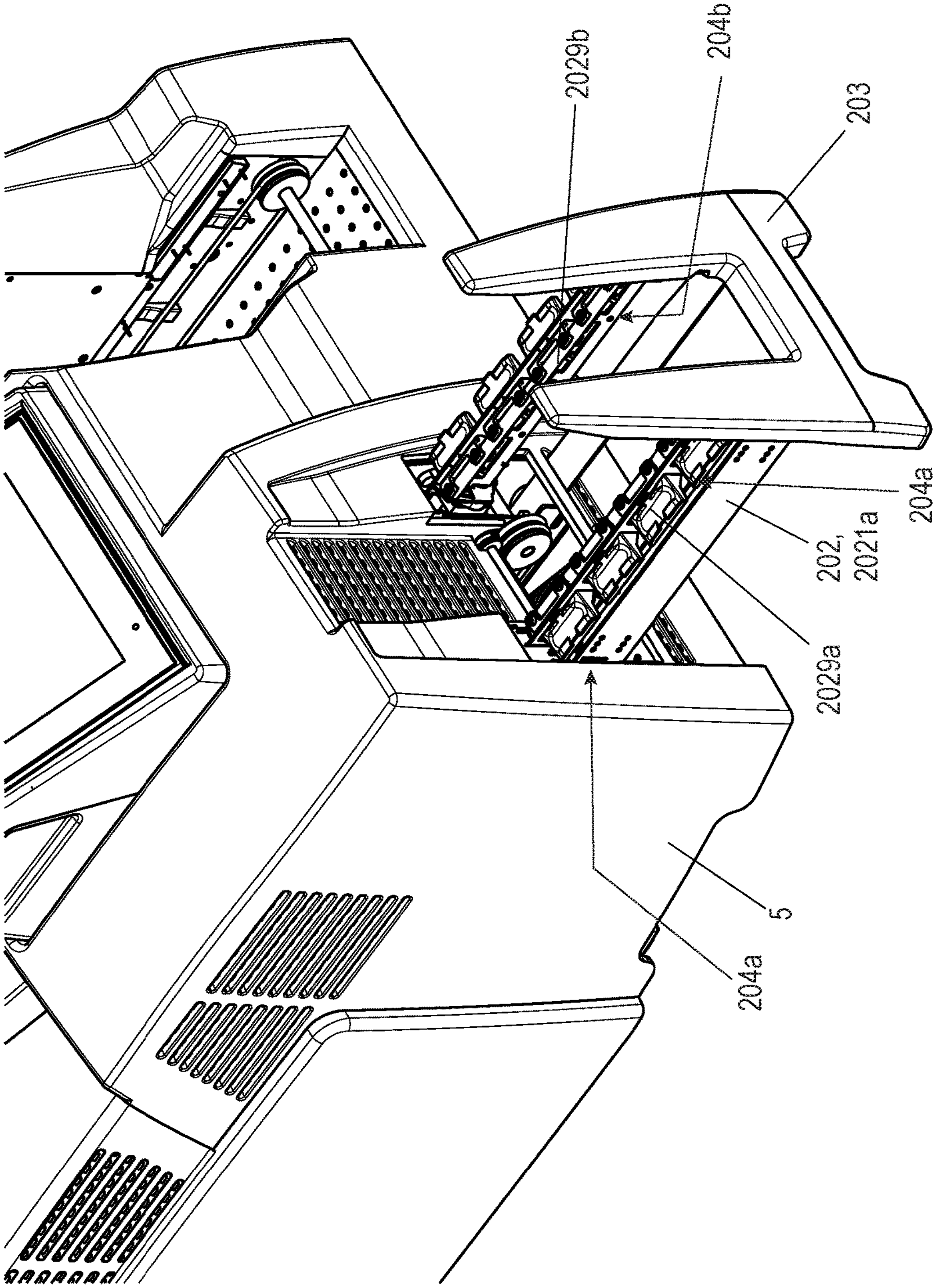
FIG. 17 is a perspective view of the printer from FIG. 16 with the empty column magazine for outputting the printed plate-like media in the working position and the magazining device in a rest position.

FIG. 17 shows the printer 1 with the output station 200 in the opened state. In the opened column magazine 201, the printed marker cards 2 are removed so that the column magazine 201 is empty. The magazining device 202, and more precisely the respective stacking units 204*a*, 204*b*, are in an outwardly pivoted position, which restricts the respective pivot angle restrictors 2024*a*, 2024*b* with regard to a possible pivoting angle. As a result, the magazining device 202 can in each case be pushed into a free installation space—to the right and left of the belt conveyor which conveys the printed marker cards 2 into the output station 200—into the housing 5 of the printer 1. As a result, in a space-saving manner, the output station 200 can be pushed into a housing 5 of the printer 1 when the printer 1 is not being used.

Figure 18:
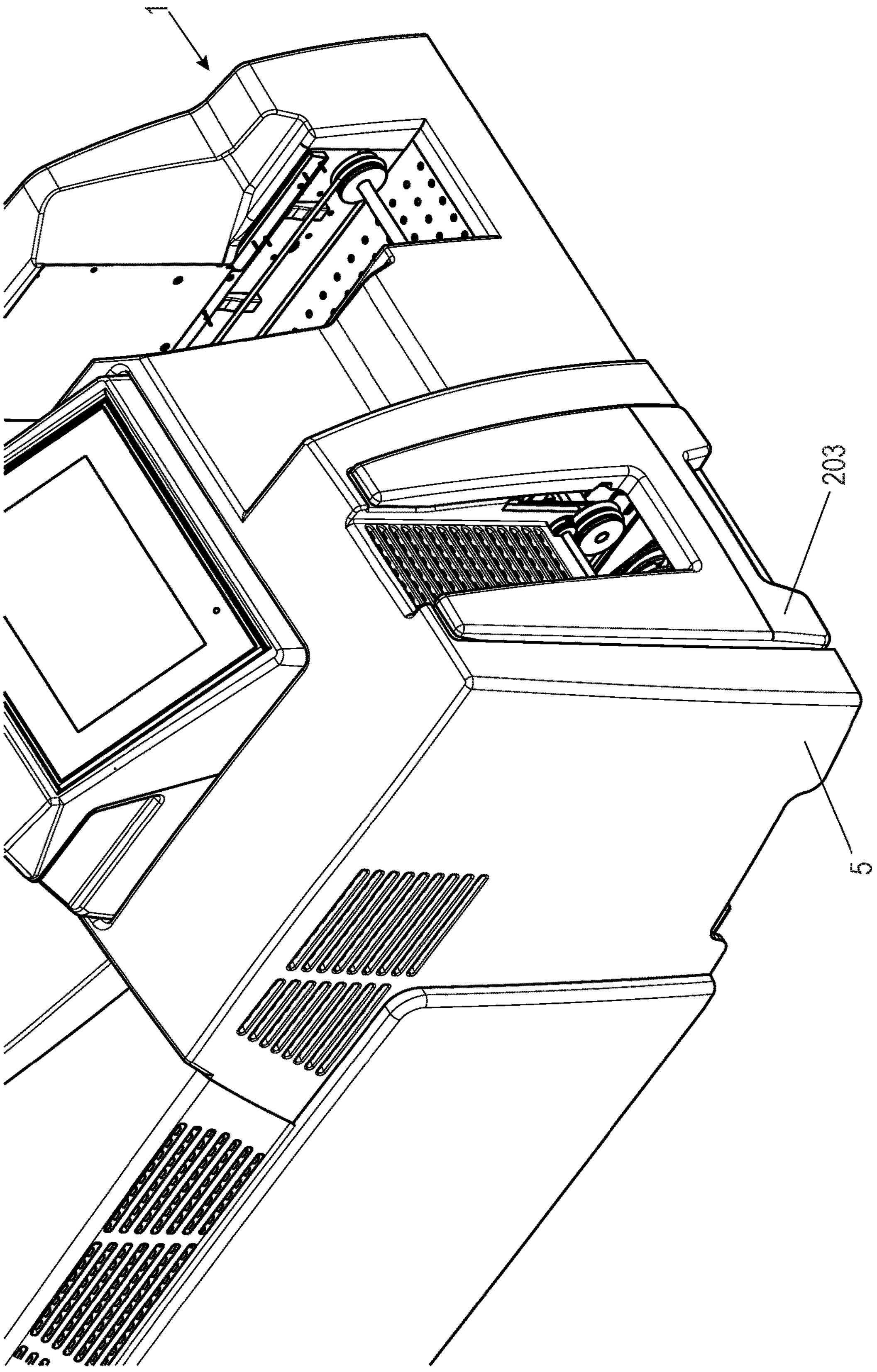
FIG. 18 is a perspective view of the printer from FIG. 17 with the column magazine for outputting the printed plate-like media in a rest position.

FIG. 18 shows the printer 1 with the output station 200 in the closed state.

The following method is specified for operating the printer.

In a first method step, the printer 1 and at least one marker card 2, which is to be printed, with markers 3 is provided.

In a second method step, the output station 200 is pulled out of the housing 5 of the printer 1 and the respective stacking unit 204*a*, 204*b* of the respective guide device 2021*a*, 2021*b* of the output station 200 is pivoted out and is brought into the home position. Alternatively, this method step can also be integrated into the first method step.

In a third method step, at least one marker card 2 to be printed is inserted into the column magazine 101 of the input station 100 of the printer 1.

In a further method step, the at least one marker card 2 to be printed is separated in the separating device 102 of the input station 100 of the printer 1.

In a further method step, the at least one separated marker card 2 is conveyed into the printing station of the printer 1. This is preferably carried out with a belt conveyor.

In a further method step, the at least one marker card 2 is printed through the printing device of the printer 1. The printing device preferably functions in accordance with an inkjet printing method. Alternatively, the printing device can also function according to a different printing method, such as a laser printing method or a thermoprinting method.

In a following method step, the at least one printed marker card 2 is conveyed into the output station 200 of the printer 1. This is preferably carried out with a belt conveyor.

In a further method step, the at least one printed marker card 2 is outputted into the magazining device 201 of the output station 200 of the printer 1.

In a following method step, the at least one printed marker card 2 is magazined by the magazining device 201 of the output station 200 of the printer 1 into the column magazine 202 in accordance with the FiFo principle.

In a final method step, the at least one printed marker card 2 is removed from the column magazine 202 of the output station 200 of the printer 1.

After termination of a printing process of the printer 1, e.g. after completion of the printing of a series of marker cards 2 for a switch cabinet, the respective stacking unit 204*a*, 204*b* of the respective guide device 2021*a*, 2021*b* of the output station 200 can optionally be pivoted in and the output station 200 can be pushed into the housing 5 of the printer 1 after the final method step.

The invention claimed is:

1. A printer for printing marker cards, comprising (a) a housing;

(b) at least one input station for the marker cards to be printed; and (c) an output station for printed marker cards including a magazining device for retaining the printed marker cards, said magazining device having at least one guide device which guides said output station and said magazining device between a first position within said housing and a second position outside said housing, each guide device including a pivotable stacking unit.

2. The printer as defined in claim 1, wherein said magazining device performs underfeed magazining which arranges the marker cards according to a first in, first out principle.

3. The printer as defined in claim 1, wherein two of said guide devices are arranged in parallel.

4. The printer as defined in claim 1, wherein each guide device contains an elongated guide aperture by which each guide device is displaceably guided in said housing.

5. The printer as defined in claim 4, wherein said guide aperture has a length which specifies the length of the extraction path of said magazining device from said housing and the length of a column magazine which is formed through extraction of said magazining device to said second position.

6. The printer as defined in claim 1, and further comprising a cover connected with said housing, a free end of each guide device being attached to said cover.

7. The printer as defined in claim 1, wherein each guide device includes a shaft supported by two bearing brackets.

8. The printer as defined in claim 7, and further comprising a frame pivotably connected with a respective shaft of each guide device.

9. The printer as defined in claim 8, wherein each pivoting frame includes two longitudinal webs and contains a plurality of openings spaced between a plurality of respective cross webs.

10. The printer as defined in claim 9, wherein one longitudinal web is connected in a rotationally fixed manner with a respective shaft, and wherein a respective pivoting frame performs a pivoting movement of a respective shaft synchronously with rotation of said respective shaft.

11. The printer as defined in claim 10, wherein said pivoting frame and said stacking tray of a first guide device form a first stacking unit and said pivoting frame and said stacking tray of a second guide device form a second stacking unit, said first and second stacking units being arranged symmetrically to one another.

12. The printer as defined in claim 11, wherein each stacking unit has an axis of rotation which is arranged parallel to one of a direction of movement of said output station between said first and second positions and to a respective guide aperture of said guiding device.

13. The printer as defined in claim 8, wherein each guide device includes a stacking tray.

14. The printer as defined in claim 13, wherein each stacking tray contains a plurality of openings which are engaged by said cross webs of a respective pivoting frame.

15. The printer as defined in claim 13, wherein said stacking trays are horizontally spaced apart from one another for receiving marker cards to be magazined.

16. The printer as defined in claim 13, wherein each stacking tray has a stacking surface.

17. A method of operating a printer as defined in claim 1, comprising the steps of a) providing the printer and at least one marker card which is to be printed with markers;

b) pulling an output station out of a housing of the printer and pivoting a respective stacking unit out of a respective guide device of an output station of the printer;

c) inserting at least one marker card to be printed into a column magazine of an input station of the printer;

d) separating at least one marker card to be printed in a separating device of the input station of the printer;

e) conveying the at least one separated marker card into a printing station of the printer;

f) printing the at least one marker card through a printing station of the printer;

g) conveying the at least one printed marker card into the output station of the printer;

h) outputting the at least one printed marker card into a magazining device of the output station of the printer;

i) magazining the at least one printed marker card by the magazining device of the output station of the printer into a column magazine in accordance with a first in first out principle; and j) removing the at least one printed marker card from the column magazine of the output station of the printer.

18. The method according to claim 17, and further comprising the step of k) pivoting the stacking unit of the respective guide device of the output station inwardly and pushing the output station into the housing of the printer.

* * * * *